US005795229A

United States Patent [19]
Johnson

[11] Patent Number: 5,795,229
[45] Date of Patent: Aug. 18, 1998

[54] VIDEO GAME POWER CONTROLLER

[76] Inventor: Edward J. Johnson, P.O. Box 642, Sunrise Beach, Mo. 65079

[21] Appl. No.: 735,524

[22] Filed: Oct. 23, 1996

[51] Int. Cl.$^6$ .................................................. A63F 9/24
[52] U.S. Cl. .................................................. 463/47
[58] Field of Search ................ 463/46, 47; 273/237, 273/238; 363/13, 15, 34, 63, 146; 320/14, 15; 323/349, 351; 439/502, 505

[56] References Cited

U.S. PATENT DOCUMENTS

| | | | |
|---|---|---|---|
| 4,965,877 | 10/1990 | Gunn | 363/146 |
| 5,243,269 | 9/1993 | Katayama et al. | 320/14 |
| 5,347,211 | 9/1994 | Jakubowski | 323/351 |

OTHER PUBLICATIONS

Radio Shack Catalog advertising Video Game DC Adapters (p. 142) and AC–to–AD Adapters with Adaptaplugs (3) Universal AC–to–DC Adapter (p. 143); publication date to be 1994.

*Primary Examiner*—George Manuel
*Attorney, Agent, or Firm*—Litman, McMahon & Brown, LLC

[57] ABSTRACT

A video game power controller selectively supplies power to multiple different video game systems. The controller includes a built-in master switch, surge protection, an EMI filter, and a parental lock-out switch. The controller is adaptable to either 110 VAC or 220 VAC power and includes a plurality of primary, independently switched DC video power plugs, at least one independently switched AC video power plug and at least one auxiliary switched DC video plug.

17 Claims, 1 Drawing Sheet

VIDEO GAME POWER CONTROLLER

FIELD OF THE INVENTION

The present invention relates to a video game power controller, and, more particularly, to a plug-in module which is capable of supplying power, either simultaneously or selectively, to a plurality of video game modules. The controller includes a master switch, a parental lock-out switch, surge protection, and independently switchable power outputs for a plurality of video game modules.

BACKGROUND OF THE INVENTION

Home video game systems have become more and more popular in recent years, particularly among young people. Due to their popularity, the number of manufacturers of game systems, and the number of game systems in each manufacturers product line, is growing. In addition, video game systems from different manufacturers are not compatible with each other. It is thus not unusual for a family to own two, three or more different video game systems from the same or different manufacturers. Each game system has its own OEM power supply incorporating a voltage reducing transformer and most include a AC/DC convertor. Typically, however, the only On/Off switch is found on the video game module itself. This means that any power supply which is plugged in is consuming power through the converting transformer, even though the game module itself may be turned off. When a family owns multiple game modules, often all of he modules will remain plugged in constantly, with each one constantly consuming power. This common habit of leaving multiple game modules plugged in also occupies wall outlets needed for other purposes, or, alternatively, requires the addition of a separate multiple socket add-on receptacle.

Furthermore, OEM video game power supplies typically do not include surge protection, overload protection or Electromagnetic Interference Protection circuitry, which must be added on via separate circuits if desired. Finally, many parents want the capability of controlling their children's use of video games via a parental lock-out switch of some type. With OEM video game power supplies, it is difficult or impossible to add an effective parental lock-out switch such that it cannot be bypasses or easily defeated, for example, by simply bypassing the lock-out switch or plugging the power supply into a different outlet.

Finally, few, if any OEM video game power supplies are adaptable to either 110 VAC, as typically found in the U.S. or 220 VAC power, as is typically found in Europe.

It is clear, then, that a need exists for a universal, multiple video game power controller. Such a controller should preferably include most of the above noted feature built-in, i.e. surge suppression, EMI protection, overload protection, a master switch, and parental lock-out features. Such a controller should preferably accommodate most video game modules from major manufacturers, and should preferably operate on either 110 or 220 VAC power.

SUMMARY OF THE INVENTION

The present invention is directed to a video game power controller for selectively supplying power to multiple different video game systems. The controller includes a power plug and a step down transformer with a master switch positioned between the transformer and the plug such that power can be cut off from the transformer even while the controller remains plugged into a wall outlet. Also positioned between the plug and the transformer are a surge protector and an EMI filter. A parental lock-out switch, which may be a key switch, a push button code switch or a timer or clock controlled switch is also positioned between the transformer and the plug.

The controller step-down transformer includes a primary winding and an additional winding which is switchable in and out of the circuit to allow the controller to be selectively used with either 110 VAC or 220 VAC power sources. A pair of secondary windings supply stepped down AC voltage to a respective pair of AC/DC convertors. A first of the secondaries and AC/DC convertors has an output connected in parallel to a plurality of switches, each of which controls a respective primary DC video game coaxial power plug such that stepped down DC power is selectively provided to each of the DC power plugs. An AC video game power plug, with a separate switch, is connected between the first secondary winding and the first AC/DC convertor to selectively provide stepped down AC power to the AC power plug.

Finally, the second secondary winding and the second AC/DC convertor supplies stepped down DC voltage to an auxiliary switch and auxiliary video game power plug such that an auxiliary video game module can be independently powered via the auxiliary power plug simultaneously with a primary video game module connected to one of the primary DC power plugs.

OBJECTS AND ADVANTAGES OF THE INVENTION

The principle objects and advantages of the present invention include: providing a video game power controller which is capable of selectively supplying power to a plurality of video game systems; providing such a controller which includes a voltage step-down transformer and a master switch for shutting off power to the step-down transformer; providing such a controller includes built-in surge protection, EMI protection and/or current overload protection; providing such a controller with a built-in parental lock-out switch; providing such a controller with primary and auxiliary AC/DC convertors; providing such a controller with multiple, independently switched primary DC power outlets, and at least one independently switched primary AC power outlet; providing such a controller with at least one, independently switched auxiliary DC power outlet; providing such a controller which is selectively operable with 110 VAC and 220 VAC power supplies; and providing such a controller which is reliable, economical to operate, has a long operating life and which is particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

The sole FIGURE is an electrical circuit schematic of one embodiment of the present invention.

DETAILED DESCRIPTION OF THE PREFERRED EMBODIMENTS

I. Introduction and Environment

Figure 1:
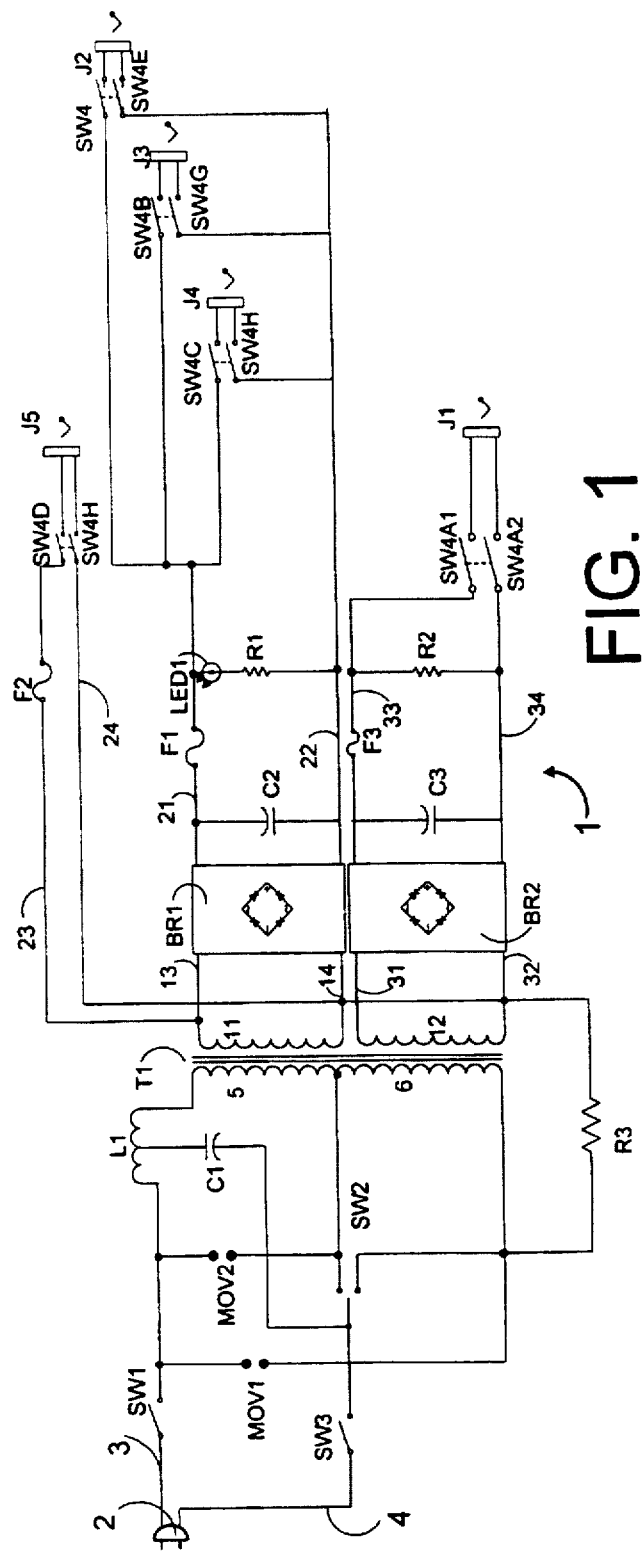

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "up", "down", "right" and "left" will refer to directions in the drawings to which reference is made. Said terminology will include the words specifically mentioned, derivatives thereof and words of a similar import.

Referring to FIG. 1, a video game power controller in accordance with the present invention is illustrated and generally indicated at 1. The controller 1 includes a typical power plug 2 for plugging into an ordinary 110 VAC 60 cycle power source (not shown). The plug 2 can also be adapted for plugging into a 230 VAC 50 cycle source, as explained below. Attached to the plug 2 are a pair of wires 3 and 4. A master switch SW1 is provided in the wire 3 for turning the controller 1 on and off. An auxiliary, parental lock-out switch SW3 is provided in wire 4 to provide an alternative shut-off to prevent unauthorized use of the controller 1 and any attached video games. The switch SW3 can be, for example, a key switch or a code push button switch.

A pair of surge protectors MOV1 and MOV2 are provided, with the surge protectors MOV1 and MOV2 being selectively placed between the wires 3 and 4, depending upon the position of a power selection switch SW2. A filter including a capacitor C1 connected between the wires 3 and 4 and an inductor L1 connected in the wire 3 provide Electromagnetic Interference protection for the controller 1 and any video games connected thereto.

A voltage step-down transformer T1 includes a pair of primary coils 5 and 6, with the coil 6 being selectively connectable in series with primary coil 5 via the power selection switch SW2. The switch SW2 is a single pole double throw switch which selectively, in the upper, 110 VAC position, connects just the primary coil 5, or, alternatively, in the lower, 220 VAC position, connects both the primary coil 5 and the primary coil 6 across the wires 3 and 4. In the 220 VAC position, the primary coil 5 and the primary coil 6 act as a voltage divider such that a consistent voltage is provided across transformer secondary windings 11 and 12 regardless of the position of the switch SW2.

The transformer T1 includes first and second secondary coils 11 and 12. The first secondary coil 11 is connected to a pair of wires 13 and 14 across which it supplies an unregulated AC voltage of approximately 9 volts. The wires 13 and 14 are, in turn, connected to two legs of a full wave bridge rectifier BR1 with a nominal output of 9 volts DC output via an additional wire pair 21, 22. A fuse F1 is provided in series with the wire 21 and a series circuit of a resistor R3 and LED1 are connected across the wire pair 21, 22 to provide a visual indication of power to the wire pair 21, 22. The wire 22, which is the negative DC terminal, is selectively connected to the common leads of three female coaxial power jacks J2–J4 via respective switch poles SW4E, SW4G and SW4H. Meanwhile the wire 21, which is the positive DC terminal, is selectively connected to the positive lead of each of the power jacks J2–J4 via the respective switch poles SW4, SW4B, and SW4C.

A wire 23 is connected between the wire 13 ahead of the bridge rectifier BR1 and an additional switch pole SW4D as an AC power terminal while a second switch pole SW4H is connected to the common wire 14 via a wire 24. The switch poles SW4D and SW4H are, in turn, connected to a fourth power jack J5 for selectively providing 9 volt AC power to the jack J5.

The second secondary coil 12 is connected to a pair of wires 31 and 32 across which it supplies an unregulated AC voltage of 9 volts. The wires 31 and 32 are, in turn, connected to two legs of a second full wave bridge rectifier BR2 with a nominal output of 9 volts DC output via an additional wire pair 33, 34. A fuse F3 is provided in series with the wire 33 and a parallel circuit of a resistor R2 and capacitor C2 is connected across the wire pair 33, 34. The wire 34, which is the negative DC terminal, is selectively connected to the common lead of a fifth female coaxial power jack J1 via a switch pole SW4A2. Meanwhile the wire 33, which is the positive DC terminal, is selectively connected to the positive lead of the power jack J1 via a switch pole SW4A1. This arrangement provides optional auxiliary power via the jack J1 to an auxiliary game module, such as, for example, a CD ROM player used in conjunction with a game module connected to any of the jacks J2–J5 described above.

Although the inventive controller 1 is not so limited, it can be used with the following game modules:

Jack J1 can supply DC power to a Sega* CD system;

Jack J2 can supply DC power to a Sega* Genesis* game module;

Jack J3 can supply DC power to a Super Nintendo* Entertainment System;

Jack J4 can supply DC power to an NEC* Turbografx* or Turbo Duo* game Module; and Jack J5 can supply AC power to a Nintendo* Entertainment System.

(* Trademarks)

In one version of the invention, the following circuit components were used:

BR 1 & 2: 1.5 Amp 50 PIV Bridge Rectifiers

LED 1: Red Subminiature Light Emitting Diode

MOV1: Metal Oxide Varistor 150 VAC Max.

MOV2: Metal Oxide Varistor 250 VAC Max.

R1: 1 Meg Ohm-0.5 Watt Resistor

R2 & R3: 1 Ohm-0.25 Watt Resistors

C1: 0.22 µF EMI Suppressor Capacitor

C2 & C3: 3,300 µF, 16 Volt Electrolytic Capacitors

L1: EMI Filter Coil Panasonic #EXC-EMT471BT

SW1: 250 VAC 1.5 Amp/125 VAC 3 Amp SPST Push On/Off Switch

SW2: 250 VAC 5 Amp/125 VAC 10 Amp DPST Slide Switch

SW3: 250 VAC 2 Amp/125 VAC 4 Amp SPST Key Switch

SW4: 125 VAC 3 Amp 4 PDT 4 station Interlocking Push button Switch

F1, F2, F3: 125 VAC 1 Amp Metric Fuses (5×20 mm) in Low profile front mount fuse holders J1–J4: Coax Power Jacks 2.5 MM ID, 5.5 MM OD J5: Coax Power Jack 2.1 MM ID, 5.5 MM OD T1: Low Profile P.C. Mount Transformer with 120/240 VAC and 20 VCT at 1.2 Amps Outputs It is to be understood that while certain forms of the present invention have been illustrated and described herein, it is not to be limited to the specific forms or arrangement of parts described and shown.

What is claimed and desired to be secured by Letters Patent is as follows:

1. A video game power controller for selective connection between an input power source and one or more of a plurality of video game systems, comprising:
   a. an input including a wire pair connectable to a line power outlet;
   b. a master switch connected in series with one wire of said wire pair;
   c. a step-down transformer connected to said wire pair;
   d. a first AC/DC power supply connectable to said transformer;
   e. a plurality of power outputs, each of which is equipped with a power jack for connection to a respective one of said video game systems;
   f. a plurality of switches, each of which is connected between said first power supply and a respective one of said power outputs;
   g. a second AC/DC power supply connectable to said transformer;
   h. at least one auxiliary power output which is equipped with an auxiliary power jack for connection to an auxiliary video game system; and
   i. an auxiliary power switch which is connected between said second power supply and said auxiliary power outputs.

2. A controller as in claim 1 and further comprising:
   a. a surge protection device connected across said wire pair.

3. A controller as in claim 1 and further comprising:
   a. an Electromagnetic Noise Interference filter connected to said wire pair.

4. A controller as in claim 1 and further comprising:
   a. a parental lock-out switch connected in series with one wire of said wire pair.

5. A controller as in claim 1 and wherein said transformer includes a primary coil and a pair of secondary coils, each of which forms a portion of a respective one of said first and second AC/DC power supplies, said controller also comprising:
   a. an additional coil; and
   b. a power control switch selectively connecting said additional coil in series with said transformer primary coil across said wire pair to complete a voltage divider circuit across said wire pair.

6. A controller as in claim 1 and further comprising:
   a. at least one AC power output connected across one of said secondary coils, which AC power output is equipped with an AC power jack for connection to a video game system; and
   b. an AC power switch which is connected between said one secondary coil and said AC power output.

7. A controller as in claim 1 and further comprising:
   a. a visual indicator means in said first AC/DC power supply providing a visual indication of power in said first AC/DC power supply.

8. A controller as in claim 1 and further comprising:
   a. a current overload protection device provided in each of said first and second AC/DC power supplies.

9. A video game power controller for selective connection between an input power source and one or more of a plurality of video game systems, comprising:
   a. an input including a wire pair connectable to a line power outlet;
   b. a master switch connected in series with one wire of said wire pair;
   c. a step-down transformer connected to said wire pair, said transformer including:
      i. a primary coil;
      ii. first and second secondary coils;
      iii. an additional coil; and
      iv. a power control switch selectively connecting said additional coil in series with said transformer primary coil across said wire pair;
   d. a first AC/DC power supply connectable to said first secondary coil of said transformer;
   e. a plurality of power outputs, each of which is equipped with a power jack for connection to a respective one of said video game systems;
   f. a plurality of switches, each of which is connected between said first power supply and a respective one of said power outputs;
   g. a second AC/DC power supply connectable to said second secondary coil of said transformer;
   h. at least one auxiliary power output which is equipped with an auxiliary power jack for connection to an auxiliary video game system;
   i. an auxiliary power switch which is connected between said second power supply and said auxiliary power outputs;
   j. at least one AC power output connected across one of said secondary coils, which AC power output is equipped with an AC power jack for connection to a video game system; and
   k. an AC power switch which is connected between said one secondary coil and said AC power output.

10. A controller as in claim 9 and further comprising:
    a. a surge protection device connected across said wire pair.

11. A controller as in claim 9 and further comprising:
    a. an Electromagnetic Noise Interference filter connected to said wire pair.

12. A controller as in claim 9 and further comprising:
    a. a parental lock-out switch connected in series with one wire of said wire pair.

13. A controller as in claim 9 and further comprising:
    a. a visual indicator means in said first AC/DC power supply providing a visual indication of power in said first AC/DC power supply.

14. A controller as in claim 9 and further comprising:
    a. a current overload protection device provided in each of said first and second AC/DC power supplies.

15. A video game power controller for selective connection between an input power source and one or more of a plurality of video game systems, comprising:
    a. an input including a wire pair connectable to a line power outlet;
    b. a master switch connected in series with one wire of said wire pair;
    c. a step-down transformer connected to said wire pair, said transformer including:
       i. a primary coil;
       ii. first and second secondary coils;

iii. an additional coil; and iv. a power control switch selectively connecting said additional coil in series with said transformer primary coil across said wire pair;

d. a first AC/DC power supply connectable to said first secondary coil of said transformer;

e. a plurality of power outputs, each of which is equipped with a power jack for connection to a respective one of said video game systems;

f. a plurality of switches, each of which is connected between said first power supply and a respective one of said power outputs;

g. second AC/DC power supply connectable to said second secondary coil of said transformer;

h. at least one auxiliary power output which is equipped with an auxiliary power jack for connection to an auxiliary video game system;

i. an auxiliary power switch which is connected between said second power supply and said auxiliary power outputs;

j. at least one AC power output connected across one of said secondary coils, which AC power output is equipped with an AC power jack for connection to a video game system;

k. an AC power switch which is connected between said one secondary coil and said AC power output;

l. a surge protection device connected across said wire pair;

m. an Electromagnetic Noise Interference filter connected to said wire pair; and n. a parental lock-out switch connected in series with one wire of said wire pair.

16. A controller as in claim 15 and further comprising:

a. a visual indicator means in said first AC/DC power supply providing a visual indication of power in said first AC/DC power supply.

17. A controller as in claim 15 and further comprising:

a. a current overload protection device provided in each of said first and second AC/DC power supplies.

* * * * *